United States Patent

Shinozaki

[15] 3,640,622
[45] Feb. 8, 1972

[54] EXPOSURE-CONTROL DEVICE IN COPYING MACHINES

[72] Inventor: Akira Shinozaki, Tokyo, Japan
[73] Assignee: Konishiroku Photo-Industry Co., Ltd.
[22] Filed: May 7, 1970
[21] Appl. No.: 35,477

[30] Foreign Application Priority Data

May 10, 1969 Japan.................................44/42,382

[52] U.S. Cl..............................................................355/65
[51] Int. Cl.........................................................G03b 27/76
[58] Field of Search..................................................355/65.4

[56] References Cited

UNITED STATES PATENTS 3,124,996  3/1964  Pfaff.........................................355/65
3,504,972  4/1970  Suzuki.....................................355/51

Primary Examiner—John M. Horan
Attorney—Harry C. Bierman, Jordan B. Bierman and Bierman and Bierman

[57] ABSTRACT

An improved exposure control device for a copying apparatus of the type having a movable optical system in said apparatus for scanning an original to be reproduced, the improved exposure control device having a pivotal shield movable with said optical system for varying the degree of exposure; a bar mounted in said copying apparatus and positioned substantially parallel to the direction of the movement of said optical system, said bar being mounted on said means for operating the exposure control device; and means movably mounted on said bar and mounted on said shield for transmitting motion of said bar to said shield whereby movement of said operating means will change the position of said shield.

6 Claims, 4 Drawing Figures

EXPOSURE-CONTROL DEVICE IN COPYING MACHINES

In case of the light-scanning-type projection optical system for a copying machine, it is usually necessary to vary the amount of light exposure in response to the photosensitiveness of a photosensitive paper used and the image density of an original to be copied. It is a common practice to conduct this by adjustment of a shield plate which is placed between the original and mirror or between the mirror and photosensitive paper. In such case, however, there is one difficult problem in connection with the structure of linking mechanism between the shield plate and the control means therefor. For this purpose, there has been known a copying machine in which a stop-controlling member (usually a control knob) is provided outside the light-scanning-type projection optical system but inside the machine body. However, such conventional stop device as above is inconvenient because it can not be operated from the outside of the machine body and the outer cover of the copying machine have to be opened for every time operation. Another type of the conventional stop devices is such one wherein a stop control knob is provided at the fixed position outside the copying machine and said knob is linked with stop control means (i.e., shield plate) located in the movable optical system by means of a clutch mechanism, whereby only when the projection optical system comes to the standstill position the stop control knob and the stop control means are allowed to link with each other so that the control of light exposure amount can be attained, while during the travelling motion of the projection optical system linking may be caused to disconnect. However, in case of the above-described stop device conventionally known, there is such defect that it needs a special clutch mechanism which can keep the correlation between the stop control knob and the stop control means unchanged even when the stop control knob is turned during the travelling of the projection optical system.

In accordance with the invention, there is provided an exposure control device which is freed from the above-mentioned disadvantages in that a control knob can be provided outside the machine body of a copying machine so that the light exposure amount in the moving optical system can be easily controlled by the control knob through a simplified mechanism.

Figure 1:
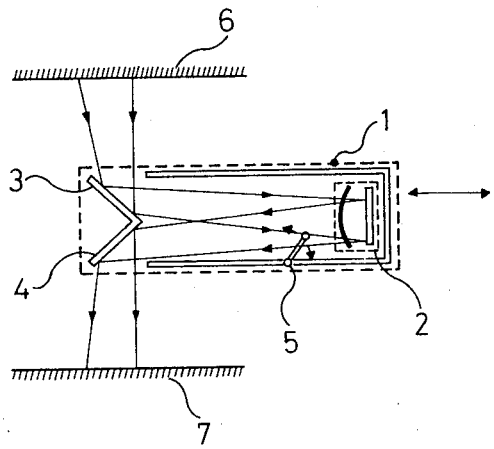
FIG. 1 shows a sketch diagram of a copying machine provided with an exposure control device of the present invention.

Now the present invention will be explained in detail by reference to the drawing. In FIG. 1, the projection optical system indicated by surrounding with dot line comprises a lens frame 1, an in-mirror lens 2, a first mirror 3 and a second mirror 4. The numeral 5 is a shield plate, which can vary the light exposure amount. There are shown an original 6 and a photosensitive paper 7, both fixed at stationary positions. The lens frame 1 is movable in the longitudinal direction as indicated by arrow, so as to effect exposure of the image of the original 6 by light-scanning to the photosensitive paper 7. The image light from the original is transmitted by reflection through the first mirror 3, the in-mirror lens 2 and the second mirror 4, to the photosensitive paper 7. The shield plate 5 is placed between the in-mirror lens 2 and the second mirror 4 thereby to effect control of the exposure amount of light. It should be noted that the location of a shield plate between the in-mirror lens and the second mirror in a light-scanning-type projection optical system has not been realized in any type of copying machines which have been known heretofore.

Figure 2:
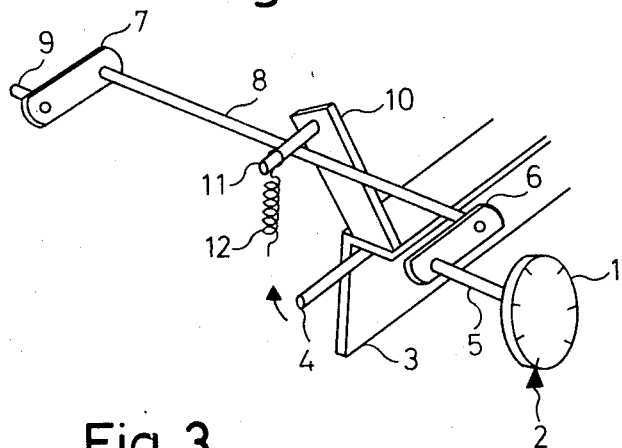
FIG. 2 is a perspective view showing one example of the present invention.

In the embodiment shown in FIG. 2, the numeral 1 is a control knob provided outside the machine body of a copying machine. The said knob carries control divisions thereon, so that by turning the knob to have appropriate division register with a pointer, control of the light exposure amount can be effected. A shield plate 3 is rotatably fixed to the optical system in a pivot manner. The knob is firmly fixed to a shaft 5 at its one end, the said shaft being fixed connected at the other end with one end of a rotary plate 6. The numeral 7 is the same as the rotary plate 6, and a common longitudinal bar 8 is fixedly connected between the free end of the rotary plate 6 and that of the rotary plate 7, so as to constitute center crank mechanism which is rotatable around the axis of the shafts 5, 9. The shaft 9 is rotatably fixed at its other end to the inside wall of the machine body. A connection plate 10 having a pin 11 on its one end is amounted on the shield plate 3 in resilient contact with the said longitudinal bar 8 by the action of a spring 12 having its other end fixed to the casing of the optical system. By turning the knob 1, the rotary plates 6, 7 are allowed to rotate thus changing the height of the longitudinal bar 8, and consequently causes rocking by intermediation of the pin 11 and connection plate 10, so as to vary the angle of the shield plate of the optical system. In the travelling of the optical system during copying process, the shield plate 3, connection plate 10, pin 11 and spring 12 move in unison with the optical system, while the pin 11 slidingly moves along the longitudinal bar 8 so that the shield plate 3 is kept to the position set by means of the control knob 2.

Figure 3:
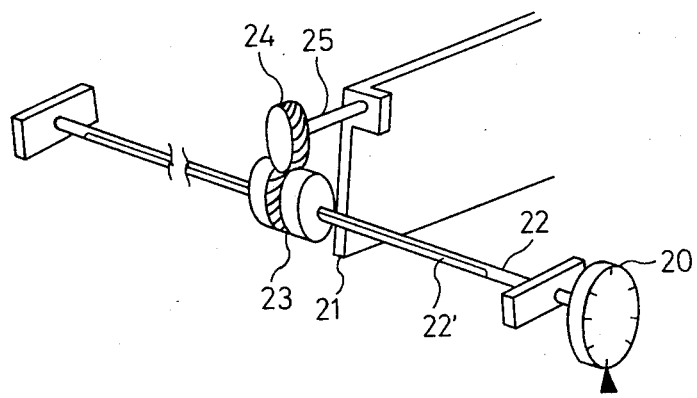
FIG. 3 is a perspective view showing another example of the present invention.

FIG. 3 shows another embodiment of the present invention, wherein a control knob 20 and a shield plate 21 are provided. The knob 20 is fixedly connected to a longitudinal bar 22 in parallel to the travelling direction of the optical system. A helical gear 23 is mounted to the longitudinal bar 22 in such a manner that the said gear 23 can slidingly move in the axial direction on said bar. Cutoff part 22' which functions to transmit rotating force to the helical gear 23 is provided on the longitudinal bar 22. A gear 24 connected integrally with the shield plate 21 through a shaft 25 is in engagement with the helical gear 23. The shield plate 21 is allowed to incline by intermediation of the longitudinal bar 22, helical gear 23 and gear 24 by turning the control knob 20, bringing about the change in the amount of light exposure in the optical system. In the event the optical system moves in its travelling direction, the helical gear 23, gear 24, shield plate 21 and shaft 25 move accordingly as they keep their position set by means of the central knob 20.

In the above embodiments mentioned in reference to FIG. 2 and FIG. 3, the operation of the control knob is directly transmitted to a longitudinal bar which is provided in parallel to the travelling direction of the optical system so as to function the adjustment of inclination of a shield plate. In the embodiment shown in FIG. 4, which is preferred for the purpose of the invention the operation of the control knob is indirectly transmitted to the same longitudinal bar as mentioned above.

Figure 4:
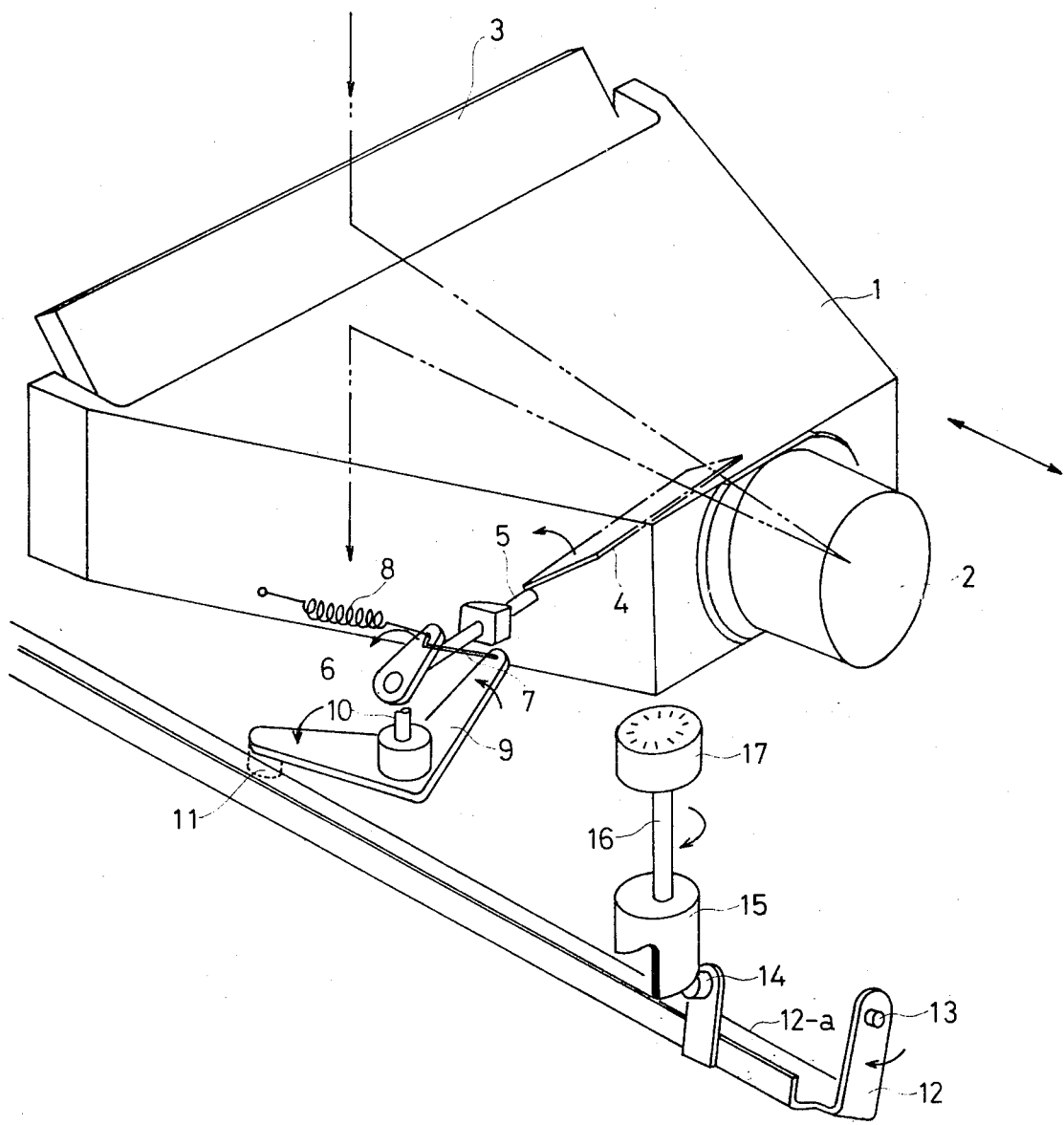
FIG. 4 also is a perspective view showing the preferred embodiment of the present invention.

In FIG. 4, there are indicated a lens frame 1, an in-mirror lens 2, a mirror 3 (consisting of a first mirror and a second mirror), a shield plate 4, a shield plate shaft 5, an arm 6, a connecting rod 7, a spring 8, a crank 9, a crankshaft 10, a crank roll 11, a crank rod 12, a crank rod shaft 13, a cam roller 14, a cam 15, a camshaft 16 and a control knob 17. The actual operation of the embodiment shown in FIG. 4 will be explained below.

In the light-scanning of the original image onto a photosensitive paper, the lens frame 1 moves in the optical axis direction of the in-mirror lens 2. The shield plate 4 which is placed in light path to control the light-exposure amount is integrally supported by the shaft 5, the one end of which is connected with the one end of the arm 6. The arm 6 is further connected at its other end with a spring 8 whereby the arm is resiliently pulled around a connecting rod 7 attached to the shaft 5. A crank 9 is rotatable around a crankshaft 10 fixed to the lens frame 1. At the one end of the crank 9, a crank roller 11 is provided so as to make contact with the operating face 12a of a crank rod 12 which is supported by a crank rod shaft 13 fixed to the machine body of the copying machine. The crank rod 12 has a sufficient length to cover the travelling path of the lens frame 1, so that the crank roller 11 can slidingly move in contact with the operating side 12a of the crank rod 12 during the travelling of the optical system. At an appropriate position of the crank rod, a cam roller 14 is fixed thereto so as to make contact with the cam surface of a cam 15 which is mounted on a camshaft 16 extending to the operation panel (not shown) of the copying machine. The camshaft 16 can be rotated by turning a control knob 17 which is fixed at the end of said camshaft and outside the machine body. As is apparent from the mechanism shown in FIG. 4, inclination of the shield plate 4 can be adjusted by turning the control knob 17 thereby to vary the amount of light exposure.

As detailedly described hereinabove, the present invention makes it possible to control with much more easiness the light-exposure amount of the moving optical system by means of a control knob provided outside the machine body of a copying machine by use of extremely simple mechanism, and the exposure control device of the present invention is of much practical use in the art of copying machines. It is, of course, to be understood that the embodiments referred to herein are not construed as limiting the scope of the invention in any way.

What we claim is:

1. In a copying apparatus of the type having a movably optical system in said apparatus for scanning an original to be reproduced, the improvement comprising an exposure control device having:
    a pivotal shield movable with said optical system for varying the degree of exposure;
    a bar mounted in said copying apparatus and positioned substantially parallel to the direction of movement of said optical system, said bar being mounted on said means for operating the exposure control device; and
    means movably mounted on said bar and mounted on said shield for transmitting motion of said bar to said shield whereby movement of said operating means will change the position of said shield.

2. An exposure control device as claimed in claim 1 wherein the means for transmitting motion of said bar to said shield are slideably mounted on said bar.

3. An exposure control device as claimed in claim 1 wherein the means for transmitting motion of said bar to said shield comprises:
    a control knob fixedly mounted to the bar;
    a helical gear slideably mounted on the bar;
    means for transmitting rotation of the bar to said helical gear; and
    a second gear in engagement with the helical gear and integrally connected with the shield.

4. An exposure control device as claimed in claim 1 wherein the means for transmitting motion of said bar to said shield comprises:
    a shaft connected to a control knob;
    a first rotary plate fixedly connected at one end to the shaft and at the other end to the bar;
    a second rotary plate rotatably fixed at one end to the inside wall of the copying apparatus and fixedly connected at the other and to the bar; and a connection plate mounted on said shield, said connection plate having a pin on one end thereof in resilient contact with the bar.

5. An exposure control device as claimed in claim 1 wherein the means for transmitting motion of said bar to said shield comprises:
    a shaft, to which the shield is fixedly mounted;
    an arm and a rod connected to said arm, said arm being connected at one end to the shaft and at the other end to a spring; and
    a crank, rotatably mounted on a crankshaft which is fixedly mounted on the movable optical system, said connecting rod also being mounted on said crank whereby when said crank is rotated, said connecting rod will urge said arm to rotate to pivot said shield.

6. In an exposure control device as claimed in claim 5 wherein the means for rotating said crank comprises:
    a crank rod, in contact with said crank by a crank roller mounted at one end of the crank, said crank rod being supported by a crank rod shaft fixed to the machine body of the copying apparatus;
    a cam roller, mounted on the crank rod;
    a cam, in contact with the cam roller and mounted on a camshaft which extends to the operation panel of the copying apparatus; and a control knob, affixed to the end of the camshaft on the operation panel.

* * * * *